United States Patent
Hari et al.

(10) Patent No.: US 10,050,536 B2
(45) Date of Patent: Aug. 14, 2018

(54) POWER CONVERTER AND METHOD OF ENTERING SKIP AT A FIXED OUTPUT POWER IN A LIGHT LOAD CONDITION INDEPENDENT OF MAGNETIZING INDUCTANCE

(71) Applicant: SEMICONDUCTOR COMPONENTS INDUSTRIES, LLC, Phoenix, AZ (US)

(72) Inventors: Ajay Karthik Hari, Scottsdale, AZ (US); Bryan Wayne McCoy, Chandler, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/227,822

(22) Filed: Aug. 3, 2016

(65) Prior Publication Data
US 2017/0288552 A1    Oct. 5, 2017

Related U.S. Application Data

(60) Provisional application No. 62/314,709, filed on Mar. 29, 2016.

(51) Int. Cl.
*H02M 3/335* (2006.01)
*H02M 1/00* (2006.01)
*H02M 1/08* (2006.01)

(52) U.S. Cl.
CPC .......... *H02M 3/33507* (2013.01); *H02M 1/08* (2013.01); *H02M 2001/0009* (2013.01); *H02M 2001/0035* (2013.01)

(58) Field of Classification Search
CPC . H02M 2001/0032; H02M 2001/0035; H02M 3/335; H02M 3/33507; H02M 3/156; H02M 3/158
See application file for complete search history.

(56) References Cited

U.S. PATENT DOCUMENTS

| | | | | |
|---|---|---|---|---|
| 2007/0121349 | A1* | 5/2007 | Mednik | H02M 3/33523 363/21.01 |
| 2008/0278225 | A1* | 11/2008 | Hu | H02M 3/33507 327/543 |
| 2010/0225293 | A1* | 9/2010 | Wang | H02M 3/33507 323/290 |

(Continued)

*Primary Examiner* — Fred E Finch, III
(74) *Attorney, Agent, or Firm* — Robert D. Atkins; Patent Law Group: Atkins and Associates, P.C.

(57) ABSTRACT

A power converter has a power transistor and inductor coupled in a conduction path with the power transistor. A switching frequency of the power transistor is reduced during a light load condition. A pulse width of a drive signal to the power transistor is controlled to select a current through the inductor and power transistor corresponding to the switching frequency to maintain a fixed output power of the power converter, and further to vary the current through the inductor and power transistor to maintain the fixed output power of the power converter over a range of switching frequencies. A first number of pulses of the drive signal to the power transistor during a first time period sets the fixed output power of the power converter. No pulses of the drive signal are provided during a second time period after the first time period.

21 Claims, 4 Drawing Sheets

(56) References Cited

U.S. PATENT DOCUMENTS

| | | | |
|---|---|---|---|
| 2011/0175587 A1* | 7/2011 | Hosotani | H02M 3/3376 323/283 |
| 2011/0267024 A1* | 11/2011 | Halberstadt | H02M 3/156 323/304 |
| 2012/0163039 A1* | 6/2012 | Halberstadt | H02M 3/3376 363/21.02 |
| 2012/0194227 A1* | 8/2012 | Lin | H02M 3/33507 327/113 |
| 2013/0223103 A1* | 8/2013 | Pahlevaninezhad | H02M 3/337 363/17 |
| 2013/0258731 A1* | 10/2013 | Xu | H02M 1/08 363/78 |
| 2014/0071717 A1* | 3/2014 | Murata | H02M 3/33507 363/21.17 |
| 2015/0280586 A1* | 10/2015 | Pasqua | H02M 3/33515 363/21.13 |
| 2015/0318777 A1* | 11/2015 | Pasqua | H02M 1/36 363/21.13 |
| 2015/0357925 A1* | 12/2015 | Tsou | H02M 3/33507 363/21.15 |
| 2016/0099639 A1* | 4/2016 | Leisten | H02M 3/3376 323/271 |

\* cited by examiner

POWER CONVERTER AND METHOD OF ENTERING SKIP AT A FIXED OUTPUT POWER IN A LIGHT LOAD CONDITION INDEPENDENT OF MAGNETIZING INDUCTANCE

CLAIM TO DOMESTIC PRIORITY

The present application claims the benefit of U.S. Provisional Application No. 62/314,709, filed Mar. 29, 2016, entitled "LIGHT LOAD OPERATION OF HIGH FREQUENCY POWER CONVERTER" invented by Ajay Karthik HARI and Bryan MCCOY, and which is incorporated herein by reference and priority thereto for common subject matter is hereby claimed.

FIELD OF THE INVENTION

The present invention relates in general to semiconductor devices and, more particularly, to a power converter and method of entering skip at a fixed output power in a light load condition independent of magnetizing inductance.

BACKGROUND

Semiconductor devices are commonly found in modern electronic products. Semiconductor devices vary in the number and density of electrical components. Semiconductor devices perform a wide range of functions such as analog and digital signal processing, sensors, transmitting and receiving electromagnetic signals, controlling electronic devices, power management, and audio/video signal processing. Discrete semiconductor devices generally contain one type of electrical component, e.g., light emitting diode (LED), small signal transistor, resistor, capacitor, inductor, diodes, rectifiers, thyristors, and power metal-oxide-semiconductor field-effect transistor (MOSFET). Integrated semiconductor devices typically contain hundreds to millions of electrical components. Examples of integrated semiconductor devices include microcontrollers, application specific integrated circuits (ASIC), power conversion, standard logic, amplifiers, clock management, memory, interface circuits, and other signal processing circuits.

A power conversion circuit converts an input voltage (AC or DC) to a second regulated direct current (DC) output voltage. The regulated DC output voltage is typically a different value than the input voltage. A power conversion circuit is used for any electronic device functioning with a DC operating voltage that derives its power from an alternating current (AC) source. For example, a television that plugs into an AC wall socket uses a power converter to convert the AC power to DC operating potential for the electronic and semiconductor components in the television. The power conversion circuit is also commonly used for charging the battery of a mobile device, e.g., cell phone and laptop computer.

The power converter can be implemented in a number of configurations. For example, a fixed frequency flyback, quasi-resonant flyback, and active clamp flyback are types of power converter circuits. Regulatory authorities establish requirements on power converter standby power and light load efficiency. Many power converters operate at a fixed switching frequency during normal or heavy loading. As the load decreased below a predetermined threshold, the switching frequency is decreased in a controlled fashion, i.e., frequency fold-back mode, to reduce the switching losses and improve overall efficiency of the power converter.

During foldback, in one mode of operation, the primary inductor current is frozen and the frequency is varied to achieve output voltage regulation, known as pulse frequency modulation (PFM). Furthermore, during foldback, there is a minimum frequency clamp, typically around 25 kHz, to avoid the operation of the power converter in the audible frequency range.

For instance, with a fixed primary inductor current in PFM mode and the frequency clamped at 25 kHz, the power delivered by a flyback power converter in discontinuous conduction mode (DCM) each cycle is fixed. The fixed power delivery (FPD) point is typically designed to be less than 10% of the maximum power. If the load continues to decrease, the power converter enters skip mode of operation to maintain regulation. Skipping cycles is necessary in standby/near-standby conditions to consume power in 10's of milli-watts range and meet various regulations. The selection of the FPD point is important to the power converter design. If the FPD point is too high, then skip mode is activated at high load possibly resulting in audible noise. If the FPD point is too low, then skip mode may not activate and the target standby power consumption cannot be achieved. For ACF or standard flyback power controller designed to operate over wide frequency range, low power consumption at light loads and FPD entry point can be difficult to achieve due to the varying primary inductance over the switching frequency range.

FIG. 1 illustrates a graph of the primary magnetizing inductance variation versus switching frequency. Primary inductance, shown as line 10, decreases non-linearly with increasing switching frequency. FIG. 2 illustrates the output power of the power converter, shown as line 20, increasing with primary inductance, given a fixed primary current at a fixed frequency. Accordingly, the delivered output power at the desired frequency of operation varies depending on primary magnetizing inductance, which varies with operating frequency. If peak primary current is fixed during foldback across all the possible frequencies of operation of the pulse width modulation (PWM) controller, either skip mode will not activate or fail to meet standby power agency requirements, or the controller will stay in skip mode at heavier loads with audible noise. The deviation in energy delivery can lead to problems in frequency fold-back mode and can generate audible noise for the customer selected primary inductance.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure. The term "semiconductor die" as used herein refers to both the singular and plural form of the words, and accordingly, can refer to both a single semiconductor device and multiple semiconductor devices.

Figure 1:
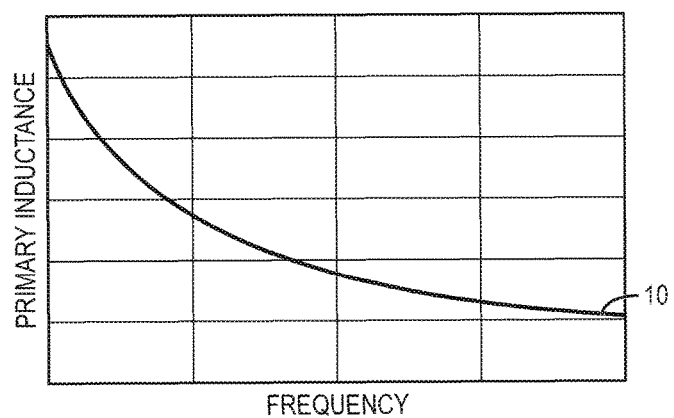
FIG. 1 illustrates a graph of primary inductance versus oscillator switching frequency with a fixed primary inductor current.
Figure 2:
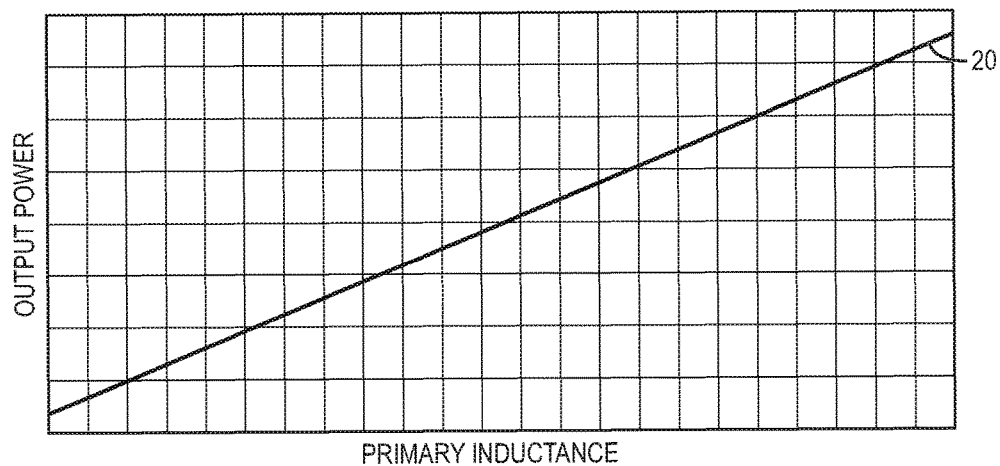
FIG. 2 illustrates a graph of output power versus primary magnetized inductance with a fixed primary inductor current while operating in PFM.
Figure 3:
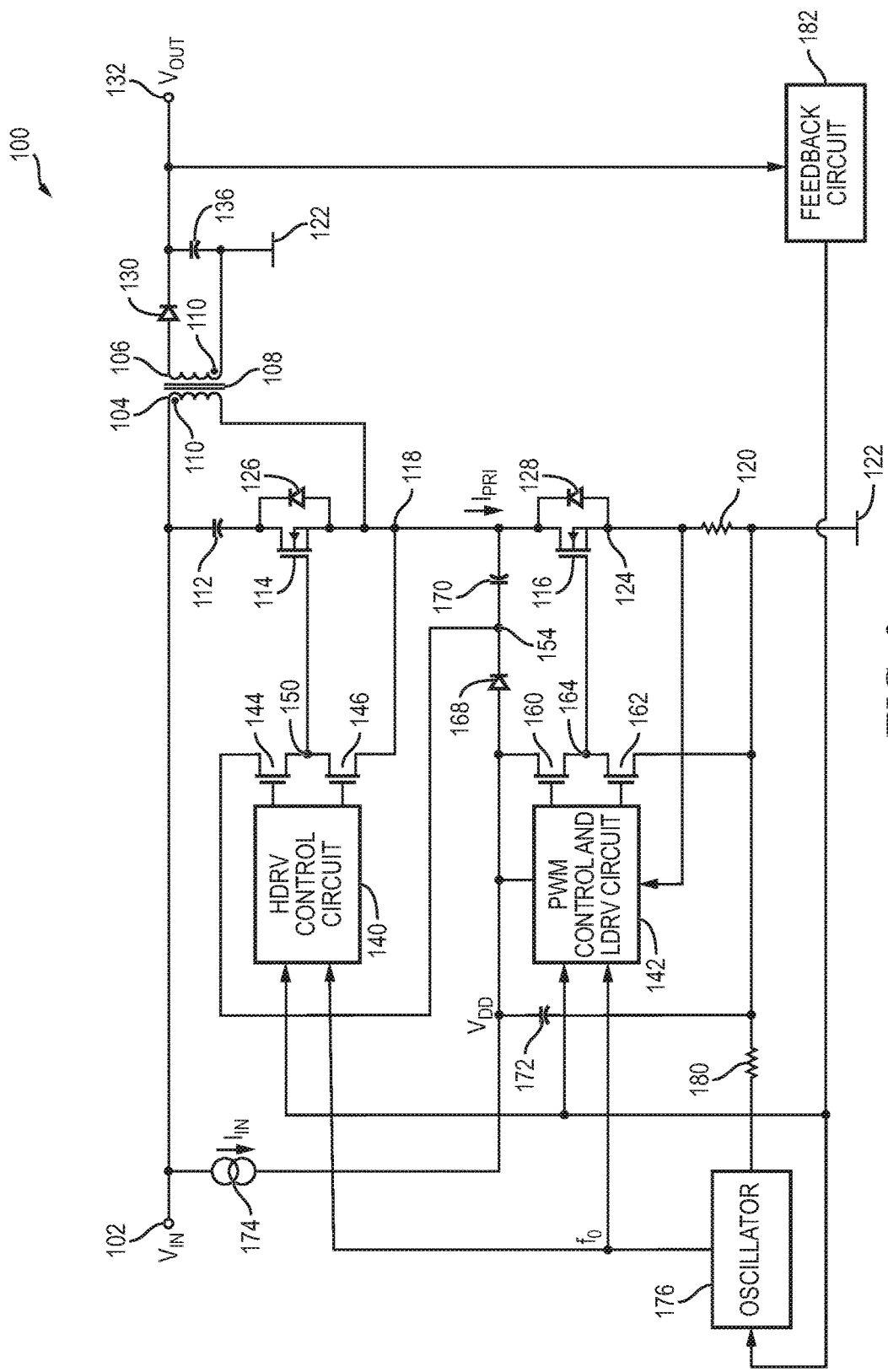
FIG. 3 illustrates a schematic and block diagram of an ACF power converter.

FIG. 3 is a schematic and block diagram of active clamp flyback (ACF) power converter 100. ACF power converter or controller 100 is implemented on a semiconductor die and packaged with an encapsulation and external leads electrically connected to certain circuit nodes. A DC input voltage VIN is applied at terminal 102 as a first external lead of the semiconductor package, which is coupled to a first terminal of inductor 104. Inductor 104 is an input or primary side of transformer 108 and inductor 106 is an output or secondary side of the transformer, shown with polarity dots 110. Inductor 104 has an inductance, referred to as primary inductance, which is a function of switching frequency fO. The primary inductance may range, but not limited, from 50 micro-henries (μh) to 1.2 milli-henries (mh). The DC input voltage VIN is further applied through capacitor 112 to the drain of power transistor 114. The source of power transistor 114 is coupled to the drain of power transistor 116 at node 118. The source of power transistor 116 is coupled through resistor 120 to power supply terminal 122 as a second external lead of the semiconductor package operating at ground potential. A primary inductor current IPRI flows through inductor 104, given the input voltage VIN, when power transistor 116 is in a conductive state. Accordingly, inductor 104 is coupled in a conduction path of power transistor 116. A current sense (CS) voltage develops across resistor 120 at node 124 from the primary inductor current IPRI flowing through power transistor 116. In one embodiment, transistors 114 and 116 are power MOSFETs and each include an internal body diode 126 and 128, respectively. A second terminal of inductor 104 is coupled to node 118. A first terminal of inductor 106 is coupled through diode 130 to output terminal 132, and a second terminal of inductor 106 is coupled to power supply terminal 122. Capacitor 136 is coupled between output terminal 132 and power supply terminal 122. Output terminal 132 provides a regulated DC output voltage VOUT during steady-state operation of ACF power converter 100.

The regulation of VOUT is achieved with high side driver (HDRV) control circuit 140 and PWM and low side driver (PWM/LDRV) control circuit 142. HDRV 140 has first and second outputs coupled to the gates of push-pull transistors 144 and 146. The source of transistor 144 and drain of transistor 146 are coupled to the gate of power transistor 114 at node 150. The source of transistor 146 is coupled to node 118, and the drain of transistor 144 is coupled to node 154. Node 154 provides operating potential to the drain of transistor 144. HDRV 140 controls power transistor 114 through push-pull transistors 144 and 146. PWM/LDRV 142 has first and second outputs coupled to the gates of push-pull transistors 160 and 162. The source of transistor 160 and drain of transistor 162 are coupled to the gate of power transistor 116 at node 164. The source of transistor 162 is coupled to ground terminal 122. Node 124 is also coupled to PWM/LDRV 142. Current source 174 is coupled to VIN and provides current IIN to generate operating potential VDD at the drain of transistor 160, as well as PWM/LDRV 142. PWM/LDRV 142 controls power transistor 116 through push-pull transistors 160 and 162. Capacitor 170 is coupled between node 154 and node 118. Capacitor 172 is coupled between the drain of transistor 160 and ground terminal 122. Programmable oscillator 176 provides a user selectable oscillator frequency fO to HDRV 140 and PWM/LDRV 142. Resistor 180 is coupled to programmable oscillator 176. A value of resistor 180 selects a normal or maximum switching frequency of oscillator 176 from 100 kHz to 1 MHz. Oscillator 176 is programmable to a range of frequencies less than the normal or maximum switching frequency set by resistor 180.

In steady state operation of ACF power converter 100, HDRV 140 and PWM/LDRV 142 provide pulses to switch (turn on and turn off) power transistors 114 and 116 in sequence to store energy in inductor 104 and then transfer that energy to inductor 106 and output terminal 132 as output voltage $V_{OUT}$. HDRV 140 and PWM/LDRV 142 operate with the oscillator switching frequency $f_O$ to deliver variable duty cycle pulses to enable transistors 144-146 and transistors 160-162 to drive the gates of power transistors 114 and 116, respectively. The oscillator switching frequency $f_O$ is selectable, say from 100 kHz to 1 MHz, and the duty cycle of the pulses is controlled with feedback circuit 182 from output terminal 132 back to inputs of HDRV 140 and PWM/LDRV 142. The duty cycle of the pulses from HDRV 140 and PWM/LDRV 142 to power transistors 114 and 116 is controlled by feedback circuit 182 to regulate $V_{OUT}$ under varying loads and input voltage conditions.

Regulatory authorities establish requirements on power converter standby power and light load efficiency. As the load decreases below a threshold, say 50% of full load, the oscillator switching frequency $f_O$ is decreased in a controlled fashion, i.e., in frequency fold-back mode, to reduce the switching losses and improve overall efficiency of the power converter. As the load decreases below 5% of full load, i.e., a light load or no-load condition, the frequency fold-back operation typically reduces $f_O$ to a minimum switching frequency of about 25 kHz. A frequency clamp is typically activated at 25 kHz to ensure that the switching frequency remains above the audible range, i.e., 22 kHz.

Under a light load or no-load condition, the output power $P_O$ delivered by ACF power converter 100 operating in DCM is given in equation (1) as:

$$P_O = 0.5 * L_{PRI} * I_{PRI}^2 * f_O \qquad (1)$$

where:
$L_{PRI}$ is primary inductance of inductor 104
$I_{PRI}$ is primary current through inductor 104
$f_O$ is switching frequency of oscillator 176

Figure 4:
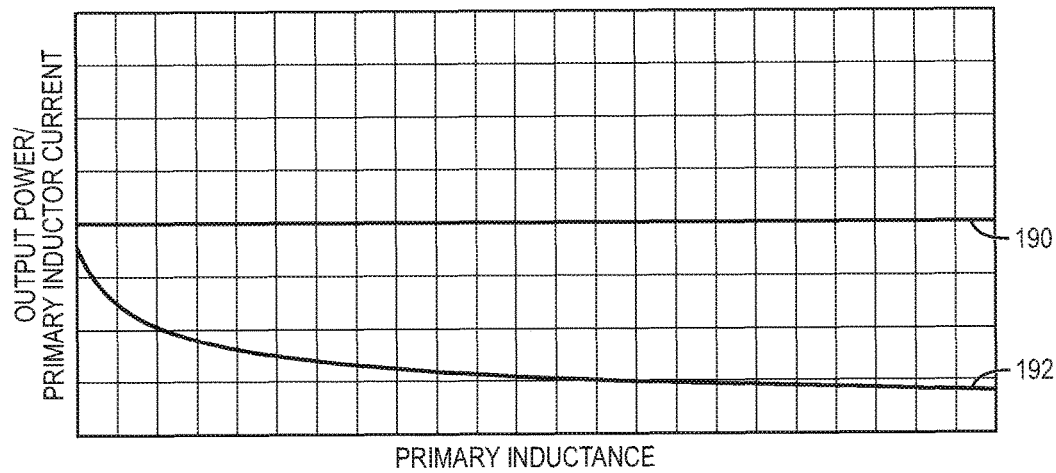
FIG. 4 illustrates a graph of output power or peak primary inductor current versus primary inductance.

The value of resistor 180 sets the normal or maximum switching frequency of oscillator 176 from 100 kHz to 1 MHz. Oscillator 176 is programmed to lower values during times of decreasing load. During the light load or no-load condition of interest, i.e., less than 5% of full load, the switching frequency $f_O$ is set to 25 kHz. Primary inductance is a function of switching frequency, so the frequency set by the oscillator $f_O$ sets the primary inductance. At the light load or no-load switching frequency of 25 kHz, ACF power converter provides a fixed or constant output power, say $P_O$=2.0 watts, in order to achieve the target standby power and light load efficiency. In order to make the output power $P_O$ relatively constant during light load or no-load conditions, the primary inductor current $I_{PRI}$ is varied over a range of switching frequencies and associated primary inductances. FIG. 4 illustrates the values of primary inductor current $I_{PRI}$, shown as line 192, over a range of primary inductance values that result in a fixed output power $P_O$. FIG. 4 further illustrates the fixed output power of ACF power converter 100, shown as line 190, over the range of primary inductance values. In other words, the output power in line 190 remains fixed and constant by varying the values of primary inductor current during foldback according to line 192 over a range of switching frequencies and associated primary inductances. Given a specific switching frequency and associated primary inductance, the proper peak primary inductor current $I_{PRI}$ is selected in accordance with line 192 to achieve a fixed output power $P_O$ in line 190. In one embodiment, ACF power converter 100 provides a fixed 2.0 watts of output power $P_O$ by varying the primary inductor current $I_{PRI}$ according to line 192 over a range of switching frequencies and associated primary inductances.

Figure 5:
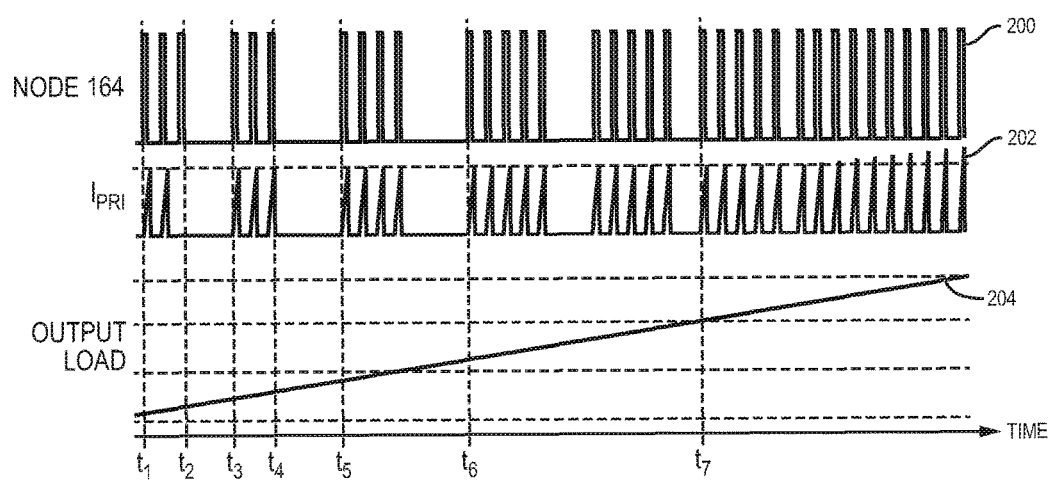
FIG. 5 illustrates operation of the ACF power converter over time.

FIG. 5 illustrates operation of ACF power converter 100 with varying loads over time. Given a light load or no-load condition at time $t_1$, PWM/LDRV 142 turns on transistor 160 which provides a high drive signal to the gate of power transistor 116 (gate voltage goes high) to turn on the power transistor. The conduction of power transistor 116 causes the primary inductor current $I_{PRI}$ to flow through inductor 104 which stores energy in the inductor. The primary inductor current $I_{PRI}$ is measured as a voltage across resistor 120. The voltage at node 124 is routed to PWM/LDRV 142. The PWM control circuit detects when the primary inductor current $I_{PRI}$ reaches the value in accordance with line 192 for the primary inductance at 25 kHz by comparing the primary inductor current $I_{PRI}$ as measured across resistor 120 and to internally stored table of values corresponding to line 192. PWM/LDRV 142 turns on transistor 162 which provides a low drive signal to the gate of power transistor 116 (gate voltage goes low) to turn off the power transistor, thus defining the first pulse width of the drive signal for the node 164 waveform in FIG. 5. During the off-time of power transistor 116 immediately after the first pulse, the energy stored in inductor 104 is transferred to inductor 106, which increases the output voltage $V_{OUT}$. The switching (turn on and turn off) of power transistor 116 occurs for a second pulse width of the drive signal, and a third pulse width of the drive signal, and so on, as shown between times $t_1$-$t_2$, with a switching frequency $f_O$=25 kHz. Each pulse width is set according to the on-time of power transistor 116 needed to reach the primary inductor current $I_{PRI}$ in accordance with line 192, given the switching frequency $f_O$. In one embodiment, the pulse width of the drive signal ranges from 200-500 nanoseconds (ns) to reach the primary inductor current $I_{PRI}$ in line 192. The output voltage $V_{OUT}$ increases with each energy storage and transfer cycle associated with each pulse at node 164. The number of pulses is determined by feedback circuit 182. When the output voltage $V_{OUT}$ reaches its regulation value, feedback circuit 182 signals PWM/LDRV 142 to stop generating pulses and turn on transistor 162 to maintain power transistor 116 in a non-conductive state. In a light load or no-load condition, PWM/LDRV 142 typically generates 3-5 pulses between times $t_1$-$t_2$.

Figure 6:
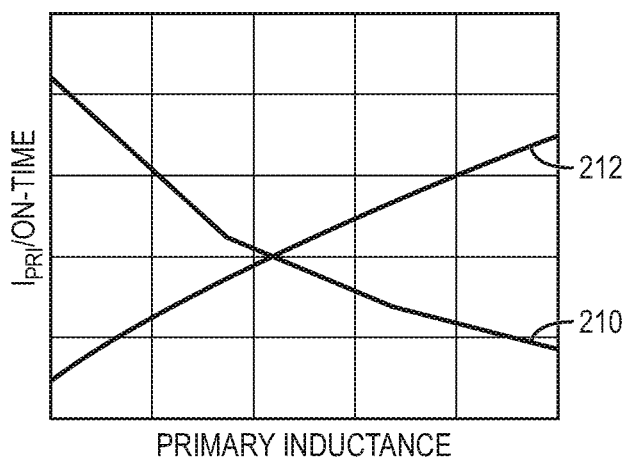
FIG. 6 illustrates a graph of measured primary inductor current and power transistor on-time versus primary inductance.

FIG. 6 illustrates a graph of primary inductor current IPRI and power transistor 116 on-time versus primary inductance. The primary inductor current IPRI decreases with increasing primary inductance. The on-time of power transistor 116 increases with increasing primary inductance.

PWM/LDRV 142 generates no pulses between times $t_2$-$t_3$, see the node 164 waveform in FIG. 5. The time period $t_2$-$t_3$ of no pulses is referred to as pulse skipping period or sleep time, with a duration of 100-300 milliseconds (ms). Power transistor 116 remains in a non-conductive state during pulse skipping period and no energy is delivered to the secondary side of transformer 108. The output voltage $V_{OUT}$ decreases under the light load or no-load condition between times $t_2$-$t_3$.

When the output voltage $V_{OUT}$ decreases to a minimum regulation threshold, the above process repeats with a series of pulses between times $t_3$-$t_4$, followed by another pulse skipping period between times $t_4$-$t_5$. Again, each pulse width is set according to the on-time of power transistor 116 needed to reach primary inductor current $I_{PRI}$ in accordance with line 192, given the switching frequency $f_O$. The cycle continues for the duration of the light load or no-load condition.

Variations in load, even within a light load state, are handled by the number of pulses needed to maintain regulation of $V_{OUT}$. The greater the load, the greater the number of pulses in order to maintain regulation of $V_{OUT}$. The time period $t_5$-$t_6$ illustrates a light load state with a greater number of pulses to maintain regulation of $V_{OUT}$. Each pulse width is set according to the on-time of power transistor 116 needed to reach primary inductor current $I_{PRI}$ in accordance with line 192, given the switching frequency $f_O$ in the light load state.

As the load increases above a light load condition at time $t_6$, i.e., greater than 5% of full load, the switching frequency may increase above 25 kHz. During times $t_6$-$t_7$, the number of pulses, width of the pulses, the length of the pulse skipping period, and the switching frequency $f_O$ is determined by the energy transfer across transformer 108 needed to maintain regulation of $V_{OUT}$. Again, each pulse width is set according to the time needed to reach primary inductor current $I_{PRI}$ in accordance with line 192, given the primary inductance associated with the higher switching frequency $f_O$. The number of pulses and the length of the pulse skipping period, given the higher switching frequency $f_O$, regulates the output voltage $V_{OUT}$. As the load on ACF power converter 100 continues to increase toward full load, pulse skipping ceases, as shown at time $t_7$, and normal PWM regulation returns for ACF power converter 100.

Figure 7:
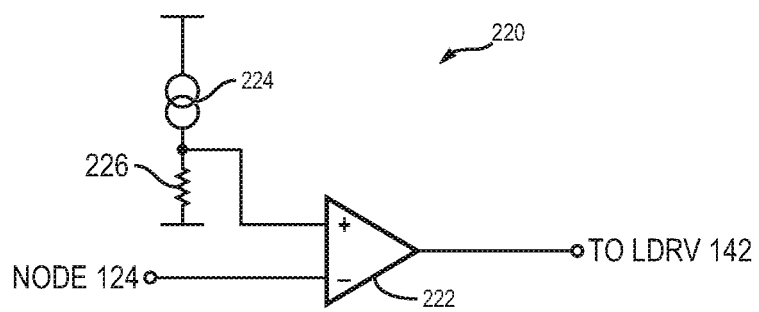
FIG. 7 illustrates a circuit to vary the primary inductor current with the switching frequency.

FIG. 7 illustrates a circuit to vary the primary inductor current with the switching frequency. Circuit 220 detects a switching frequency dependent threshold of primary inductor current $I_{PRI}$ and sends a signal to PWM/LDRV 142 to end the pulse and turn off power transistor 116. An inverting input of amplifier 222 is coupled to node 124 to receive a voltage representative of primary inductor current $I_{PRI}$. Current source 224 provides a current proportional to the switching frequency $f_O$ of oscillator 176. Current source 224 is coupled to resistor 226 to generate a reference voltage at the non-inverting input of amplifier 222 proportional to the switching frequency $f_O$ of oscillator 176. The output of amplifier 222 is coupled to PWM/LDRV 142. At time $t_1$ in FIG. 5, PWM/LDRV 142 turns on transistor 160, which in turn enables power transistor 116 to conduct primary inductor current $I_{PRI}$. When the primary inductor current $I_{PRI}$ exceeds the reference voltage across resistor 226, which is proportional to the switching frequency $f_O$, the output of amplifier 222 causes PWM/LDRV 142 to end the pulse by turning on transistor 162 and turning off power transistor 116. Accordingly, PWM/LDRV 142 generates a pulse at node 164 that is a function of the switching frequency $f_O$, which causes the primary inductor current $I_{PRI}$ to vary with the switching frequency $f_O$. The lower the switching frequency $f_O$, the lower the primary inductor current $I_{PRI}$, and the higher the switching frequency $f_O$, the higher the primary inductor current $I_{PRI}$.

While one or more embodiments have been illustrated and described in detail, the skilled artisan will appreciate that modifications and adaptations to those embodiments may be made without departing from the scope of the present disclosure.

What is claimed:

1. A method of maintaining a fixed output power during a light load condition in a power converter, comprising:
   providing a range of programmable switching frequencies;
   selecting a switching frequency of a power transistor;
   reducing the switching frequency of the power transistor during the light load condition;
   providing a relationship of a current through the power transistor according to a primary inductance of a transformer of the power converter that provides fixed output power of the power converter; and
   controlling a pulse width of a drive signal to the power transistor to vary the current through the power transistor according to the relationship to maintain the fixed output power of the power converter during the light load condition.

2. The method of claim 1, further including measuring a value of the current through the power transistor to control the pulse width of the drive signal to the power transistor.

3. The method of claim 1, further including:
   providing a first number of pulses of the drive signal to the power transistor during a first time period to set the fixed output power of the power converter; and
   providing no pulses of the drive signal during a second time period after the first time period.

4. The method of claim 3, further including:
   providing a second number of pulses of the drive signal to the power transistor during a third time period after the second time period to set the fixed output power of the power converter, wherein the second number of pulses is different from the first number of pulses; and
   providing no pulses of the drive signal during a fourth time period after the third time period.

5. The method of claim 1, further including:
   setting the switching frequency of the power transistor to different values in response to different loads on the power converter; and
   varying the current through the power transistor to maintain the fixed output power of the power converter for the different values of the switching frequency.

6. The method of claim 1, wherein the current through the power transistor varies with the switching frequency.

7. A method of maintaining a fixed output power during a light load condition in a power converter, comprising:
   providing a switching frequency of a power transistor for a full-load condition;
   reducing the switching frequency of the power transistor during the light load condition;
   providing a relationship of a current through the power transistor according to a primary inductance of a transformer of the power converter that provides fixed output power of the power converter; and
   controlling a pulse width of a drive signal to the power transistor to set the current through the power transistor according to the relationship to maintain the fixed output power of the power converter.

8. The method of claim 7, further including controlling the pulse width of the drive signal to the transistor to vary the current through the power transistor to enter a fixed power delivery point at the same output power over a range of programmable switching frequencies.

9. The method of claim 7, further including measuring a value of the current through the power transistor to control the pulse width of the drive signal to the power transistor.

10. The method of claim 7, further including:
    providing a first number of pulses of the drive signal to the power transistor during a first time period to set the fixed output power of the power converter; and
    providing no pulses of the drive signal during a second time period after the first time period.

11. The method of claim 10, further including:
    providing a second number of pulses of the drive signal to the power transistor during a third time period after the second time period to set the fixed output power of the power converter, wherein the second number of pulses is different from the first number of pulses; and
    providing no pulses of the drive signal during a fourth time period after the third time period.

12. The method of claim 7, further including:
    setting the switching frequency of the power transistor to different values in response to different loads on the power converter; and
    varying the current through the power transistor to maintain the fixed output power of the power converter for the different values of the switching frequency.

13. The method of claim 7, wherein the current through the power transistor varies with the switching frequency.

14. The method of claim 7, further including providing a relationship of the current through the power transistor and the switching frequency.

15. A power converter providing a fixed output power during a light load condition, comprising:
    a power transistor;
    an oscillator having an input coupled for receiving a feedback signal from the output of the power converter and an output providing a switching frequency of the power transistor in response to the feedback signal; and
    a controller for controlling a pulse width of a drive signal to the power transistor to select a current through the power transistor to maintain the fixed output power of the power converter during the light load condition.

16. The power converter of claim 15, further including a current sensing circuit coupled to the controller for measuring a value of the current through the power transistor to control the pulse width of the drive signal to the power transistor.

17. The power converter of claim 15, wherein the controller provides a first number of pulses of the drive signal to the power transistor during a first time period to set the fixed output power of the power converter, and provides no pulses of the drive signal during a second time period after the first time period.

18. The power converter of claim 17, wherein the controller provides a second number of pulses of the drive signal to the power transistor during a third time period after the second time period to set the fixed output power of the power converter, wherein the second number of pulses is different from the first number of pulses, and provides no pulses of the drive signal during a fourth time period after the third time period.

19. The power converter of claim 15, further including a feedback circuit coupled between an output of the power converter and the controller for setting the switching frequency of the power transistor to different values in response to different loads on the power converter, wherein the controller varies the current through the power transistor to maintain the fixed output power of the power converter.

20. The power converter of claim 15, further including a transformer with a primary side inductor coupled in a conduction path of the power transistor, wherein the primary side inductor includes a primary inductance.

21. The power converter of claim 20, wherein the controller includes a relationship of the current through the power transistor according to the primary inductance that provides fixed output power of the power converter.

* * * * *